July 13, 1954     G. A. LYON     2,683,628
WHEEL COVER
Filed Dec. 28, 1949     3 Sheets-Sheet 1
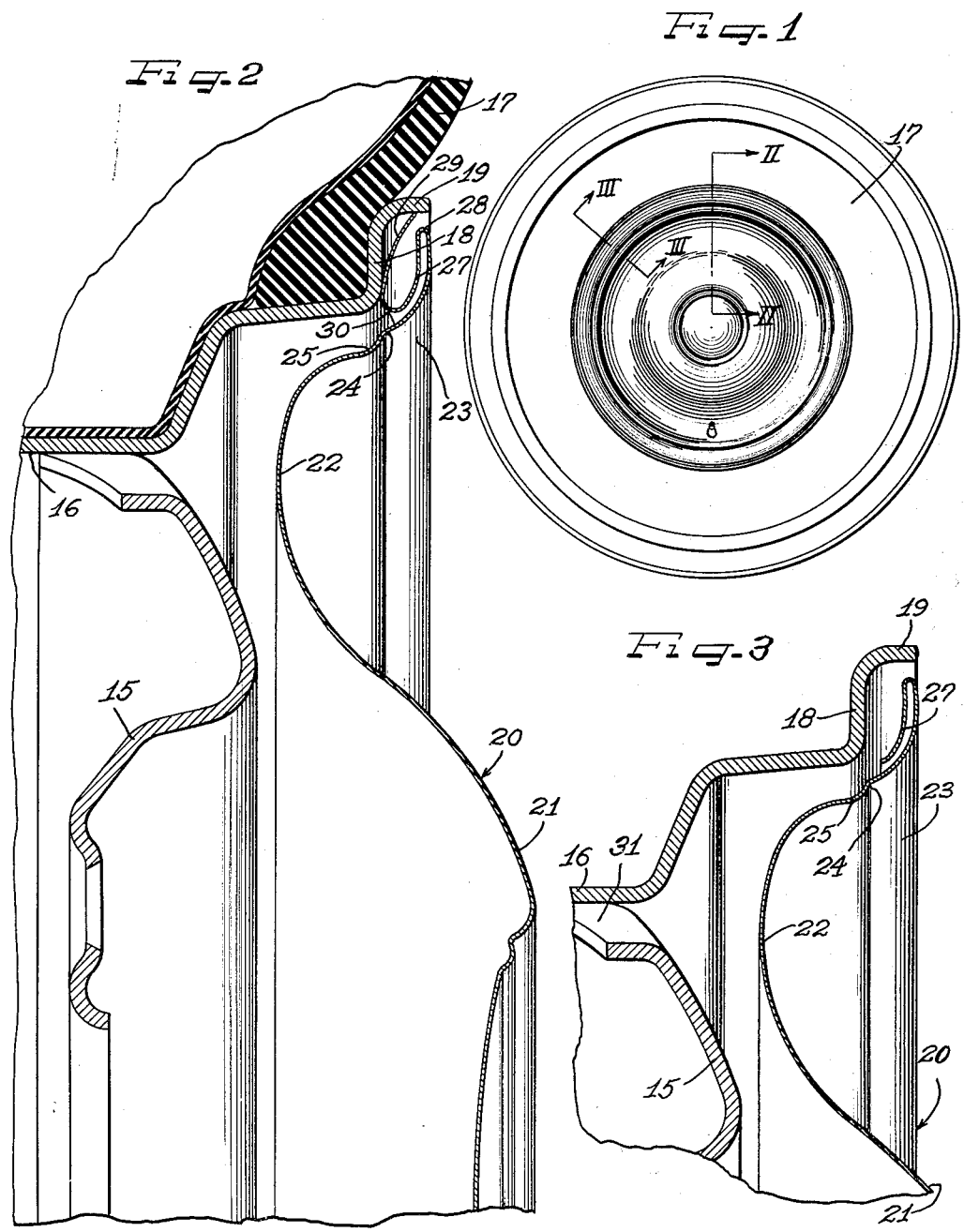
Inventor
GEORGE ALBERT LYON July 13, 1954   G. A. LYON   2,683,628
WHEEL COVER
Filed Dec. 28, 1949   3 Sheets-Sheet 2
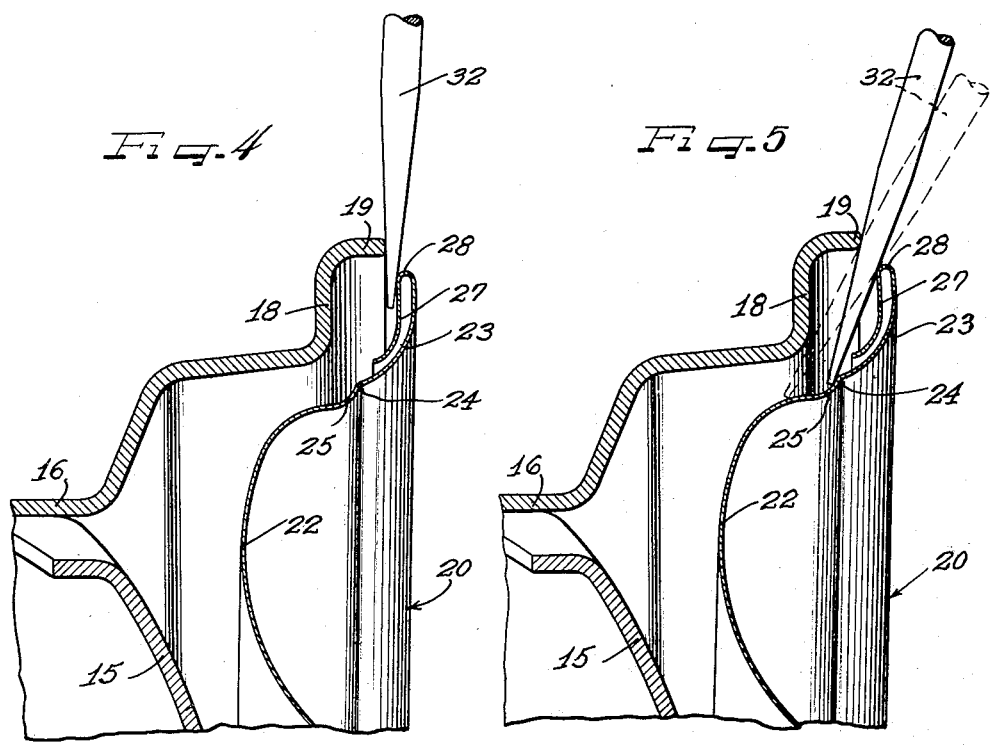
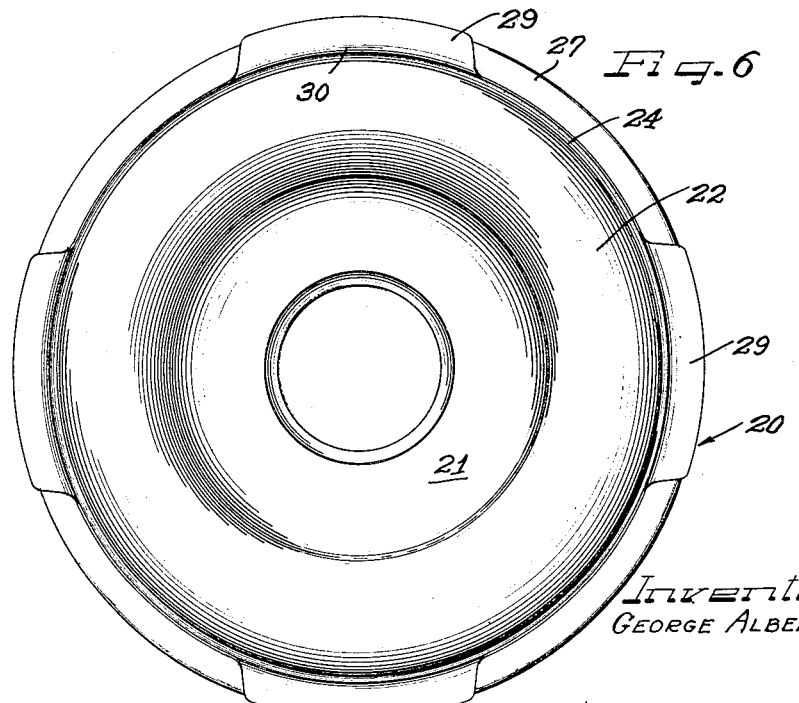
Inventor
GEORGE ALBERT LYON July 13, 1954  G. A. LYON  2,683,628
WHEEL COVER
Filed Dec. 28, 1949  3 Sheets-Sheet 3
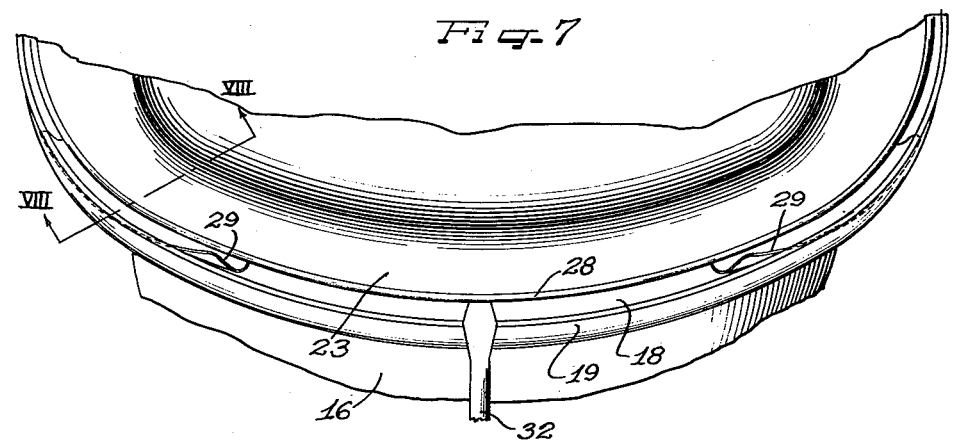
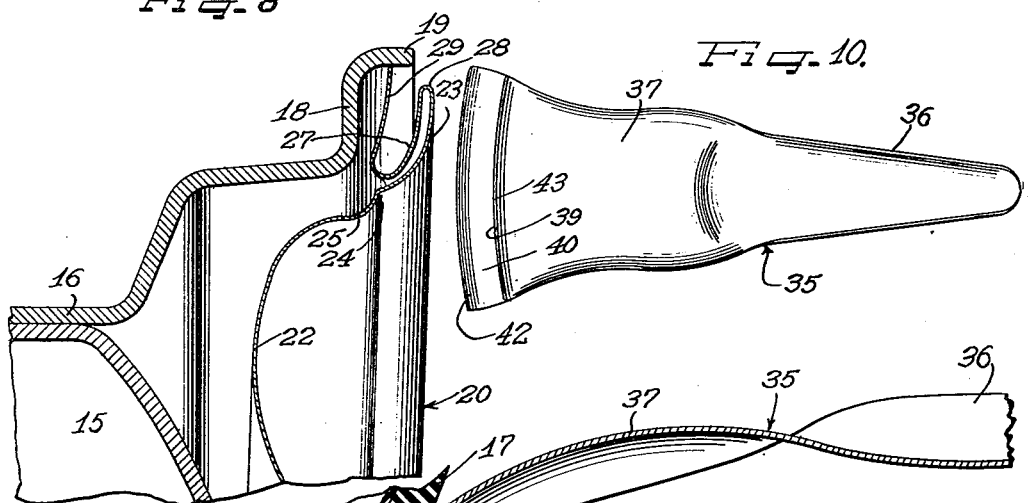
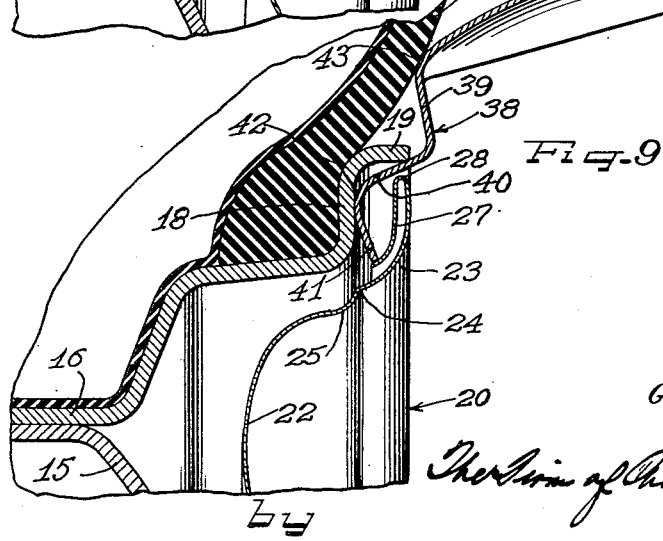
Inventor
GEORGE ALBERT LYON Patented July 13, 1954

2,683,628

UNITED STATES PATENT OFFICE 2,683,628

WHEEL COVER

George Albert Lyon, Detroit, Mich.

Application December 28, 1949, Serial No. 135,469

11 Claims. (Cl. 301—37)

The present invention relates to improvements in wheel structures and more particularly concerns improvements in means for covering ornamentally and protectively the outer sides of vehicle wheels.

An important object of the present invention resides in the provision of an improved wheel structure including a cover for the outer side of the wheel structure embodying novel means for removably attaching the cover in place on the wheel.

Another important object of the invention is to provide a wheel structure having a novel cover on the outer side thereof including improved retaining means for detachably securing the cover in snap-on, pry-off relation at the tire rim of the wheel.

A further object of the invention is to provide an improved wheel cover for the outer side of a vehicle wheel having a multi-flange tire rim and wherein the cover includes a novel retaining finger construction for snap-on, pry-off engagement with the terminal flange of the tire rim of a wheel with which the cover is associated.

A further object of the invention is to provide improved retaining finger structure on a wheel cover.

Yet another object of the invention is to provide an improved vehicle wheel cover having novel means for accommodating a pry-off tool in ejecting the cover from a wheel.

A still further object of the invention is to provide improved means for removing a wheel cover from a wheel to which the cover has been applied.

According to the general features of the present invention there is provided in a wheel structure including a multi-flange tire rim and a body supporting the tire rim, the tire rim having a generally radially and axially outwardly extending terminal flange, a cover disposed at the outer side of the wheel and having a convexly curved outer margin including an underturned flange extending radially and axially inwardly in spaced relation to the marginal portion and including a plurality of generally radially and axially outwardly projecting retaining fingers engaging against the inner side of the axially outwardly extending portion of the terminal flange and being of a length to be in stressed inwardly bowed condition and of a flexibility to turn upon the application of pry-off force to the margin of the cover.

According to other general features of the invention the cover has a pry-off tool rib projecting axially inwardly at a point closely adjacent to but radially inwardly of the inner edge of the underturned flange and at the radially inner side of the convex marginal portion.

According to yet other general features of the invention there is provided a cover for disposition at the outer side of a vehicle wheel and having a radial extent to overlie the tire rim of the wheel, the outer edge of the cover being of a diameter to extend in radially inwardly spaced relation to the terminus of the tire rim and having an underturned marginal flange extending to a substantial extent radially inwardly and axially inwardly and having underturned generally radially and axially outwardly extending retaining fingers of such width as to engage with a substantial segment of the inner face of the tire rim terminal flange and being flexibly bendable so that one side of the finger is bendable into concave form while the opposite side of the finger is bendable into convex form in prying the cover free from the tire rim.

According to other features of the invention there is provided a vehicle wheel cover for disposition at the outer side of a wheel and with the outer margin in close adjacency to the terminal flange of the tire rim of the wheel, the outer margin of the cover having an underturned flange of substantial width extending radially and axially inwardly and having a plurality of generally radially outwardly extending retaining fingers adapted to engage against the inner side of the axially outwardly extending portion of the terminal flange of the tire rim, said fingers being of a width to engage a substantial arc of the tire rim flange and having the ends thereof arcuately conformed on a radius to engage the tire rim flange, each of the retaining fingers being progressively detachable from the tire rim by compound flexure of the finger and progressive incremental disengagement from the tire rim commencing at one side of the finger and progressing toward the other side of the finger upon the application of pry-off force to the margin of the cover adjacent to the finger.

Other objects, features and advantages of the present invention will be readily apparent from the following detailed description of a preferred embodiment thereof taken in conjunction with the accompanying drawings, in which:

Figure 1 is a side elevational view of a vehicle wheel showing a cover according to the present invention applied thereto;

Figure 2 is an enlarged radial sectional view taken substantially on line II—II of Figure 1;

Figure 3 is a fragmentary radial sectional view taken substantially on the line III—III of Figure 1;

Figure 4 is a radial sectional view similar to Figure 3 but showing the cover in the process of prying the same from the wheel;

Figure 5 is a view similar to Figure 4 but showing a further stage in the prying of the cover from the wheel;

Figure 6 is a rear elevational view of the cover of Figures 1 and 2;

Figure 7 is an edge perspective view of the wheel and cover showing the cover in process of being detached;

Figure 8 is a fragmentary radial sectional view taken substantially on the line VIII—VIII of Figure 7;

Figure 9 is a radial sectional view similar to Figure 3 but showing the use of a novel pry-off tool for removing the cover; and Figure 10 is a rear elevational view of the pry-off tool of Figure 9, on a reduced scale.

As shown on the drawings:

The present invention is especially useful with a vehicle wheel of the kind currently in use on automobiles and the like and including a wheel body 15 and a tire rim 16 to which the wheel body is attached in any suitable fashion. The tire rim 16 is of the multi-flange, drop center type adapted to support a pneumatic tire and tube assembly 17 and having at its outer side an angular terminal flange structure including a generally radially extending portion 18 and a generally axially outwardly extending portion 19.

At its outer side the wheel is protectively and ornamentally covered by a wheel cover 20 which in the present instance is of the one piece overall or full disk type. To this end the cover comprises a more or less axially outwardly projecting crown portion 21, an annular intermediate cross sectionally dished or concave portion 22 generally simulative of the intermediate or large juncture groove customary between the tire rim and the bulging portion of the wheel body, and a marginal convex portion 23 arranged to be disposed in substantial concealing relation to the outer side of the tire rim.

Novel means are provided at the outer margin of the wheel cover for self-engaging, snap-on, pry-off retaining cooperation with the terminal flange structure of the tire rim. For this purpose the marginal portion 23 of the cover affords a substantially rigid annular rib which is further reinforced and stiffened by a generally axially inwardly extending annular rib 24 at the inner side of the marginal portion 23 and at juncture of the marginal portion with the intermediate portion 22 of the cover. Additional reinforcement for the cover margin is afforded by a narrow annular convex rib 25 at juncture of the rib 24 with the intermediate portion 22. Hence the marginal area of the cover is strongly reinforced by an undulating pattern of reinforcing ribs 23, 24 and 25 reading from the outer edge of the cover inwardly.

Yet additional reinforcement for the outer margin of the cover is afforded by an underturned concave convex annular flange 27 which by preference lies parallel in spaced relation behind the marginal rib 23, extending generally radially inwardly and then turning axially inwardly to a point adjacent to the inwardly extending reinforcing rib 24. At juncture of the flange 27 with the marginal rib 23 a short radius edge stiffening rib of more or less bead-like shape 28 is provided which faces radially outwardly and lies on a cover edge circumference slightly less than the inside diameter of the terminal flange portion 19 of the tire rim adjacent to which and radially inwardly from the inner side of the tip of which terminal flange portion 19 the edge rib 28 is adapted to be disposed in full assembly with the wheel. For this purpose, the inner, axially inwardly projecting edge of the underturned marginal flange 27 is provided with a plurality, herein four equidistantly spaced generally radially and axially outwardly extending retaining fingers 29 arranged to engage endwise against the inner face of the axially extending portion 19 of the tire rim terminal flange in retaining, gripping relation. Each of the retaining fingers 29 is longer than the underturned flange 27 to a sufficient extent to project radially outwardly beyond the perimeter of the cover sufficiently to bridge the gap between the cover perimeter or edge and the tire rim terminal flange portion 19 and actually to an extent such that normally the tips of the fingers lie on a circumference of greater diameter than the diameter of the inner face of the terminal flange portion 19. At juncture with the inner margin of the flange 27, the fingers 29 are formed with respective juncture ribs 30 of substantial radius in cross section and lying on the radius of the inner edge of the flange 27 throughout the length of the ribs. By reason of the substantial radius cross section of the ribs 30, the inner margins of the fingers 29 project substantially axially inwardly, and by preference such projection is of an extent which enables seating of the inner shoulder at the inner margins of the fingers against the inner margin of the radial terminal flange portion 18 substantially at juncture of the flange portion with the intermediate flange of the tire rim. The relative spacings involved are such that the outer marginal rib 23 of the wheel cover is thus disposed at substantially the plane of the edge of the tire rim terminal flange outer portion 19 in the full assembly of the cover with the wheel. As best seen in Figure 6, the retaining tips of the retaining fingers 29 are formed on a circle conforming to the radius of the annular inner face of the terminal flange portion 19 and the width of each of the fingers is such as to engage a relatively large arc, in each instance, of the terminal flange portion 19.

In applying the cover 20 to the wheel, the cover is generally centered with respect to the outer side of the wheel and with the inner faces of the retaining fingers 29 resting against the edge of the terminal flange portion 19. Then, by pressing axially inwardly against the cover the retaining fingers 29 are caused to yield and snap into inwardly camming, retaining engagement with the tire rim terminal flange, the cover being fully assembled with the wheel when the inner shoulders of the fingers engage against the terminal flange portion 18. In this fully retained relationship of the cover, the retaining fingers 29 are held under radially inward stress which affords a radially outward strong gripping reaction of the tips of the fingers against the inner face of the terminal flange portion 19. As best seen in Figure 2, in the retaining relationship to the tire rim, the fingers are somewhat bowed concavely as permitted by the substantial resilience inherent in the fingers resulting from the length of the fingers and the peripheral curvature on which the juncture ribs 30 thereof are formed. As a result, the resilient tension in the retaining fingers acts to force the inner seating shoulders of the fingers tightly against the tire rim flange portion 18 and thus strongly resists accidental dislodgement of the cover from the wheel.

By reason of the spaced relation of the periphery of the cover from the tire rim terminal flange portion 19 and the spaced relation of the inner edge of the underturned marginal flange 27 from the tire rim, a free passage is afforded about the outer margin of the cover for air circulation through the wheel by way of wheel openings 31 between the wheel body 15 and the tire rim 16, as best seen in Figure 3.

Although the wheel cover 20 is quite thoroughly retained on the wheel during service, the particular construction of the cover margin and the retaining fingers 29 enables the cover to be pried off of the wheel with substantial facility when necessary. One manner of ejecting the cover from the wheel is illustrated in Figures 4, 5, 7 and 8 involving the use of a pry-off tool such as a screw driver 32. Thus, the tip of the screw driver 32 is inserted into the gap between the edge of the terminal flange outer portion 19 and the edge of the tire rim at an intermediate point between a pair of the retaining fingers 29. By fulcruming the pry-off tool on the tire rim edge, axially outward force is applied at the peripheral rib 28 of the cover. As a result, the resilient retaining fingers 29 turn over substantially as shown in Figure 8 and the inner shoulder of the fingers draws away from the opposing shoulder afforded by the tire rim terminal flange portion 18 and the outer portions of the fingers flex away from the underturned marginal flange 27 which is forced outwardly with the margin of the cover by the action of the pry-off tool.

Having thus started ejection of the cover, the tip of the pry-off tool 32 is thrust inwardly as shown in full line in Figure 5 until the tip engages against the reinforcing rib 24 and further leverage is then exerted against the margin of the cover to drive the outer margin of the cover further outwardly and effect disengagement of the retaining fingers 29 from the tire rim marginal portion 19. Such disengagement of the retaining fingers, as has been closely observed in practice, occurs gradually and progressively starting at the sides of the proximate fingers adjacent to the pry-off point and as the cover assumes a more and more tilted position during progress of the pry-off action, the releasing edge portions of the fingers gradually turn from the convexly bowed condition shown in Figure 8 to the radially and axially outward condition as shown in Figure 7. Therein it will be seen that the adjacent sides of the fingers have turned outwardly and have slipped beyond the edge of the tire rim terminal portion 19. This action progresses until the proximate fingers 29 have snapped entirely clear of the tire rim terminal flange and the cover is ejected from the wheel. It will thus be apparent that as the pry-off action progresses the fingers 29 due to their unusual width which, as is apparent from Figures 6 and 7 is several times the length of the fingers, are capable of and actually do smoothly disengage from the tire rim terminal flange progressively from side to side while the body of the respective fingers progressively bends flexibly from the pry-off stressed convex flexure condition through a compound, sinuous flexing action to the normal generally radially and axially outward condition of the fingers.

As the pry-off progresses, the pry-off tool 32 may be driven further inwardly until the radially outer side of the inwardly bulged intermediate portion 22 is engaged by the side of the pry-off tool tip substantially as indicated in dash outline in Figure 5.

Pry-off of the cover 20 is further substantially facilitated by the use of a special pry-off tool 35 as shown in Figures 9 and 10. This tool is preferably made from sheet metal stamped to form and comprises a handle portion 36 of transversely concave form, an intermediate convex body portion 37 and a pry-off head 38. The sinuous, multi-curved body and handle portions of the tool afford maximum rigidity with minimum material. The pry-off head portion of the tool comprises a plurality of angular flanges including an inwardly right angular juncture flange 39, an outwardly right angular intermediate flange 40 and a generally inwardly and rearwardly angled pry-off tip flange 41. Juncture between the intermediate and pry-off tip flanges 40 and 41 is on a rounded shoulder 42. The arrangement of the flanges of the pry-off head 38 is such that the pry-off tip flange 41 is conveniently inserted into the gap between the cover periphery 28 and the terminal flange portion 19 and the pry-off head inserted between the margin of the cover and the terminal flange until the end of the pry-off tip flange 41 engages against the inner margin of the underturned marginal flange 27. As will be observed from Figure 10, the pry-off head 38 is formed on the radius of the inner side of the terminal flange portion 19 and is of quite substantial width so as to afford a large area of engagement between the pry-off tip flange 41 and the underturned marginal flange 27 of the cover.

With the pry-off tool 35 assembled with the tire rim and cover, substantially as shown in Figure 9, the shoulder 42 of the pry-off head engages against the tire rim flange portion 18 and the intermediate head portion 40 engages against the edge of the tire rim terminal flange portion 19. Thereupon by levering the handle 36 the portion 40 fulcrums about the tire rim edge to drive the pry-off tip 41 outwardly and thus initiate pry-off of the cover until a shoulder 43 at juncture of the head flange portion 39 with the intermediate or body portion 37 engages against the outer side of the tire and fulcruming thereagainst in the continued levering of the tool completes the ejection of the cover.

By reason of the severally reinforced margin of the cover 20 pry-off, whether accomplished by the conventional screw driver type of pry-off tool 32 or by the special pry-off tool 35 is accomplished without any danger of damaging the margin of the cover. Moreover, by reason of the substantial flexibility of the exceptionally wide, resilient retaining fingers 29 assures not only that the cover is retained quite effectively in a thoroughly retained floating, substantially shockproof relation on the wheel, but during pry-off the retaining fingers efficiently flex and contort without taking a set or damage and the cover can therefore be replaced with full retaining efficiency inhering in the retaining fingers 29.

It will be understood that modifications and variations may be effected without departing from the scope of the novel concepts of the present invention.

I claim as my invention:

1. In a wheel structure including a multi-flange tire rim and a body supporting the tire rim, the tire rim having a generally radially and axially outwardly extending terminal flange, a cover disposed at the outer side of the wheel and having a convexly curved outer margin including an underturned flange extending radially and axially inwardly in spaced relation to the marginal portion and including a plurality of generally radially and axially outwardly projecting retaining fingers engaging against the inner side of the axially outwardly extending portion of the terminal flange and being of a length to be in stressed inwardly bowed condition and of a flexibility to turn upon the application of pry-off force to the margin of the cover, the cover having a pry-off tool rib projecting axially inwardly at a point closely adjacent to but radially inwardly of the inner edge of the underturned flange and at the radially inner side of the convex marginal portion.

2. A wheel cover for disposition at the outer side of a vehicle wheel including a multi-flange tire rim having a generally radially outwardly and then axially outwardly extending angular terminal flange, a cover body having a marginal portion arranged to overlie the inner portion of the tire rim terminal flange and including an underturned marginal flange extending generally radially and axially inwardly for overlying relation to the inner portion of the terminal flange, the inner edge of the flange extending generally axially inwardly and having a plurality of peripherally spaced retaining fingers thereon each of which comprises an integral extension from the flange edge and has a curved juncture shoulder with the flange edge and a finger body portion extending generally radially and axially outwardly for engagement with the outer portion of the tire rim terminal flange, each of the fingers being of substantially greater width than length and said shoulder being formed on a peripheral curvature conforming to the curvature of the tire rim periphery.

3. A wheel cover for disposition at the outer side of a vehicle wheel including a multi-flange tire rim having a generally radially outwardly and then axially outwardly extending angular terminal flange, a cover body having a marginal portion arranged to overlie the inner portion of the tire rim terminal flange and including an underturned marginal flange extending generally radially and axially inwardly for overlying relation to the inner portion of the terminal flange, the inner edge of the flange extending generally axially inwardly and having a plurality of peripherally spaced retaining fingers thereon each of which comprises an integral extension from the flange edge and has a curved juncture rib shoulder with the flange edge and a finger body portion extending generally radially and axially outwardly for engagement with the outer portion of the tire rim terminal flange, each of the fingers being of substantially greater width than length and said shoulder being formed on a peripheral curvature conforming to the curvature of the tire rim periphery, the cover having a generally axially inwardly projecting annular reinforcing rib adjacent to but spaced radially inwardly from the juncture rib shoulder of the fingers.

4. In a wheel structure including a wheel body and a multi-flange tire rim having a terminal flange of angular cross section including a radially outwardly extending inner portion and a generally axially outwardly extending outer portion, a wheel cover for disposition at the outer side of the wheel including a tire rim covering marginal portion having a convex outer marginal rib and an underturned marginal reinforcing flange behind said rib joined to the rib on a short radius reinforcing rib lying adjacent to but in spaced relation to the tip of the outer portion of the tire rim terminal flange, said underturned cover flange extending radially and axially inwardly to a point adjacent to but spaced from the inner margin of the inner portion of the terminal flange and having a plurality of retaining fingers on said edge joined thereto on juncture ribs of substantial cross sectional radius and curved in circumference conformable to the curvature of the outer portion of the terminal flange, juncture of the body portions of the fingers with said juncture ribs comprising engagement shoulders engaging against the inner margin of the inner portion of the terminal flange while the tips of the fingers engage retainingly and under stress against the inner face of the outer portion of the terminal flange and the stress reaction urges the shoulders against the inner terminal flange portion.

5. In a wheel structure including a wheel body and a multi-flange tire rim having a terminal flange of angular cross section including a radially outwardly extending inner portion and a generally axially outwardly extending outer portion, a wheel cover for disposition at the outer side of a wheel including a tire rim covering marginal portion having a convex outer marginal rib and an underturned marginal reinforcing flange behind said rib joined to the rib on a short radius reinforcing rib lying adjacent to but in spaced relation to the tip of the outer portion of the tire rim terminal flange, said underturned cover flange extending radially and axially inwardly to a point adjacent to but spaced from the inner margin of the inner portion of the terminal flange and having a plurality of retaining fingers on said edge joined thereto on juncture ribs of substantial cross sectional radius and curved in circumference conformable to the curvature of the outer portion of the terminal flange, juncture of the body portions of the fingers with said juncture ribs comprising engagement shoulders engaging against the inner margin of the inner portion of the terminal flange while the tips of the fingers engage retainingly and under stress against the inner face of the outer portion of the terminal flange and the stress reaction urges the shoulders against the inner terminal flange portion, the edge rib of the cover being in pry-off tool gap relation to the tip of the tire rim terminal flange and the cover having a reinforcing rib radially inwardly from the juncture ribs of the retaining fingers for engagement by a pry-off tool inserted through said gap for prying the cover from the wheel.

6. In a wheel structure including a wheel body and a multi-flange tire rim having a terminal flange of angular cross section including a radially outwardly extending inner portion and a generally axially outwardly extending outer portion, a wheel cover for disposition at the outer side of the wheel including a tire rim covering marginal portion having a convex outer marginal rib and an underturned marginal reinforcing flange behind said rib joined to the rib on a short radius reinforcing rib lying adjacent to but in spaced relation to the tip of the outer portion of the tire rim terminal flange, said underturned cover flange extending radially and axially inwardly to a point adjacent to but spaced from the inner margin of the inner portion of the terminal flange and having a plurality of retaining fingers on said edge joined thereto on juncture ribs of substantial cross sectional radius and curved in circumference conformable to the curvature of the outer portion of the terminal flange, juncture of the body portions of the fingers with said juncture ribs comprising engagement shoulders engaging against the inner margin of the inner portion of the terminal flange while the tips of the fingers engage retainingly and under stress against the inner face of the outer portion of the terminal flange and the stress reaction urges the shoulders against the inner terminal flange portion, said fingers being of a length to flex into convexly arched condition upon the application of pry-off force behind said underturned flange.

7. In a wheel structure including a wheel body and a multi-flange tire rim having a terminal flange of angular cross section including a radially outwardly extending inner portion and a generally axially outwardly extending outer portion, a wheel cover for disposition at the outer side of the wheel including a tire rim covering marginal portion having a convex outer marginal rib and an underturned marginal reinforcing flange behind said rib joined to the rib on a short radius reinforcing rib lying adjacent to but in spaced relation to the tip of the outer portion of the tire rim terminal flange, said underturned cover flange extending radially and axially inwardly to a point adjacent to but spaced from the inner margin of the inner portion of the terminal flange and having a plurality of retaining fingers on said edge joined thereto on juncture ribs of substantial cross sectional radius and curved in circumference conformable to the curvature of the outer portion of the terminal flange, juncture of the body portions of the fingers with said juncture ribs comprising engagement shoulders engaging against the inner margin of the inner portion of the terminal flange while the tips of the fingers engage retainingly and under stress against the inner face of the outer portion of the terminal flange and the stress reaction urges the shoulders against the inner terminal flange portion, said fingers being of a length to flex into convexly arched condition upon the application of pry-off force behind said underturned flange, the width of said fingers being substantially greater than the length of the fingers whereby upon pry-off the sides of the fingers proximate the point of pry-off force application slip out of engagement with the tire rim terminal flange in advance of the remaining portions of the fingers and turn back to substantially initial radially and axially outward projecting condition progressively as the pry-off continues until the entire fingers snap out of engagement with the tire rim terminal flange.

8. A wheel cover for disposition at the outer side of a vehicle wheel including a multi-flange tire rim including an angular terminal flange, a wheel cover body having a marginal portion for overlying the terminal flange and including an underturned generally radially and axially inwardly extending flange having a plurality of radially and axially outwardly extending retaining fingers adapted to engage with the outwardly extending portion of the terminal flange, said fingers being of substantial length and flexible on a transverse axis, and also being of a width substantially greater than their length and thus flexible about various longitudinal axes, and said fingers having reverse bend junctures directly at the inner margin of said flange.

9. In a vehicle wheel cover for disposition in substantially concealing relation to the outer side of a vehicle wheel including a multi-flange tire rim having a generally angular terminal flange structure, a cover body having a convex annular rib margin and an underturned marginal flange joining the marginal rib on a short radius radially extending reinforcing rib, said underturned flange lying in spaced relation to and being of substantially the same width as said rib, the inner edge of the underturned flange having a plurality of radially and axially outwardly extending retaining fingers joined thereto on a reinforcing rib of substantial radius cross section.

10. In a vehicle wheel cover for disposition in substantially concealing relation to the outer side of a vehicle wheel including a multi-flange tire rim having a generally angular terminal flange structure, a cover body having a convex annular rib margin and an underturned marginal flange joining the marginal rib on a short radius radially extending reinforcing rib, said underturned flange lying in spaced relation to and being of substantially the same width as said rib, the inner edge of the underturned flange having a plurality of radially and axially outwardly extending retaining fingers joined thereto on a reinforcing rib radius, said fingers being of greater length than the width of said underturned flange to project radially outwardly therebeyond for stressed retaining engagement with the terminal flange of the wheel and being several times as wide as long so as to have substantial compound flexibility.

11. In a wheel structure including a wheel body and a multi-flange tire rim having a terminal flange of angular cross-section including a radially outwardly extending inner portion and a generally axially outwardly extending outer portion, a wheel cover for disposition at the outer side of a wheel including a tire rim covering marginal portion, the outer edge of said marginal portion being of a diameter to extend in radially inwardly spaced relation to said outer portion of the tire rim and having therebehind a flange structure extending generally radially and axially inwardly to a point adjacent to but spaced from the inner margin of the inner portion of the terminal flange, said flange structure having a plurality of generally radially and axially outwardly extending retaining fingers spaced behind said flange structure and adapted to engage with the outer portion of the angular tire rim terminal flange for retaining the cover on the wheel, said fingers having reverse bend junctures directly at the inner margin of the flange structure and having engagement shoulders engaging against the inner portion of the terminal flange while the tips of the fingers engage retainingly and under stress against the inner face of the outer portion of the terminal flange.

References Cited in the file of this patent

UNITED STATES PATENTS

| Number | Name | Date |
| --- | --- | --- |
| 2,276,105 | Shiells | Mar. 10, 1942 |
| 2,368,228 | Lyon | Jan. 30, 1945 |
| 2,386,233 | Lyon | Oct. 9, 1945 |
| 2,404,390 | Lyon | July 23, 1946 |
| 2,500,221 | Wagner | Mar. 14, 1950 |